United States Patent [19]

Lewis et al.

[11] 4,040,994

[45] Aug. 9, 1977

[54] CURED EPOXY RESINS

[75] Inventors: Morton Lewis, Elmhurst; John F. Rohrer, Lombard, both of Ill.

[73] Assignee: Unitech Chemical Inc., Chicago, Ill.

[21] Appl. No.: 745,454

[22] Filed: Nov. 26, 1976

[51] Int. Cl.² .................................... C08G 59/02
[52] U.S. Cl. ........................... 260/18 PF; 260/18 EP; 260/47 EA; 260/47 EC
[58] Field of Search ......... 260/18 PF, 18 EP, 47 EA, 260/47 EC

[56] References Cited

U.S. PATENT DOCUMENTS

| | | | |
|---|---|---|---|
| 2,682,514 | 6/1954 | Newey | 260/18 PF |
| 2,935,492 | 5/1960 | Newey | 260/18 PF |
| 2,944,035 | 7/1960 | Wear | 260/18 PF |
| 2,967,162 | 1/1961 | Vasta | 260/18 PF |
| 2,992,196 | 7/1961 | Ilardo et al. | 260/18 PF |
| 3,050,480 | 8/1962 | Budde | 260/18 PF |
| 3,154,504 | 10/1964 | Carey et al. | 260/18 PF |
| 3,784,583 | 1/1974 | Smith | 260/18 PF |
| 3,977,996 | 8/1976 | Katzakian, Jr. et al. | 260/47 EA |
| 3,978,026 | 8/1976 | Katzakian, Jr. et al. | 260/47 EC |

*Primary Examiner*—Eugene C. Rzucidlo
*Attorney, Agent, or Firm*—Edward T. McCabe; Charles E. Bouton; Robert E. Blankenbaker

[57] ABSTRACT

Improved epoxy resins are prepared by the anhydride curing of an epoxy system containing three or more epoxy compounds, at least two of which are epoxidized fatty acid esters.

10 Claims, No Drawings

CURED EPOXY RESINS

This invention relates to the preparation of epoxy resins having improved physical properties, and in particular relates to epoxy resin systems which contain at least two epoxidized fatty acid esters.

Anhydride cured epoxy resins are well known commercial products used extensively, for example, in the electronics industry for encapsulating electronic components. Typical of these epoxy resins are the cross-linked diglycidyl ethers of bis-phenol. In view of economic factors, many attempts have been made to substitute epoxidized oils for synthetic epoxy resins in anhydride cured epoxy systems. Generally, epoxidized oils cure very slowly, taking several days to complete their cure. Also, the resulting cured resin products are often friable, and usually exhibit poor physical properties.

Accordingly, there is a need in the epoxy resin art to provide epoxy resin compositions containing epoxidized fatty acid esters, which resins exhibit suitable physical and functional properties. It is therefore a primary objective of the present invention to provide improved epoxy resins which contain epoxidized fatty acid esters.

It is also an object of the present invention to provide an improved process for preparing epoxy resins which contain epoxidized fatty acid esters.

It is a further object of the present invention to provide improved epoxy resin systems containing glycidyl polyethers of a polyhydric phenol, along with at least two epoxidized fatty acid esters.

It is an additional object of the present invention to provide improved epoxy resin systems containing epoxidized triglycerides, which systems exhibit unexpectedly superior thermal shock properties.

Briefly, these and other objects of the invention may be accomplished by providing a resin composition prepared by the anhydride curing of an epoxy resin containing at least three distinct epoxy compounds. At least one of the epoxy compounds is a non-fatty polyepoxide having reactive 1,2-epoxy groups. Moreover, at least two of the epoxy compounds are epoxidized fatty acid esters. The curing reaction is catalyzed by the presence of a typical epoxy/anhydride reaction accelerator. The cured resins are thermosetting, exhibiting excellent thermal shock resistance. The cured epoxy resin systems prepared in accordance with this invention have utility as adhesives, protective coatings, laminates and moulded products. The cured resins have particular utility as casting and potting compounds for electrical circuits and insulators. Due to the presence of large amounts of epoxidized fatty esters, it is quite surprising that cured epoxy resins exhibiting such excellent physical properties are obtained.

In accordance with the present description of the invention, we intend to use the descriptive phrase "non-fatty polyepoxide compounds" as inclusive of all epoxy compounds having reactive 1,2-epoxy groups, except epoxidized fatty acid esters. Non-fatty is defined as meaning the absence of a straight or branched carbon chain having from about 10 1 to 22 carbon atoms.

The reaction system should contain from about 25 to 75% by weight (basis total epoxy compounds) of at least one non-fatty polyepoxide compound having reactive 1,2-epoxy groups. Preferably, the system will contain from about 50-75% by weight (basis total epoxy compounds) of the non-fatty polyepoxide. It is, of course, well understood to those skilled in the art that, under appropriate reaction conditions, suitable anhydrides will react with any polyepoxide materials having such reactive 1,2-epoxy groups. Hence, the present invention broadly covers the use of any such non-fatty polyepoxide compounds, whether monomeric or polymeric, saturated or unsaturated, aliphatic or cycloaliphatic, aromatic or heterocyclic. Moreover, the epoxides may be substituted, if desired, with other substituents besides the oxirane groups, e.g., hydroxyl groups, ether radicals and halogen atoms, particularly chlorine and bromine. As illustrative of the state of the art with respect to non-fatty polyepoxide compounds having reactive 1,2-epoxy groups that can be utilized herein, U.S. Pat. No. 3,977,996, Columns 4–10, is hereby incorporated by reference.

Particularly suitable terminal 1,2-epoxide groups are the 1,2-epoxy ethyl and 1,2 epoxy propyl groups. The epoxy propyl groups are often linked to an oxygen atom so as to provide a glycidyl ether or glycidyl ester group. A preferred class of non-fatty polyepoxide compounds which can be used in the present invention encompasses the epoxy polyethers obtained by reacting an epihalohydrin, such as epichlorylhydrin or epibromohydrin, with a polyhydric phenol. In particular, among the polyhydric phenols which can be used in preparing these resinous epoxy polyethers, are the dihydric phenols represented by the general formula:

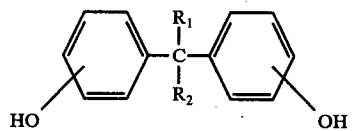

wherein the phenolic hydroxy groups may be in the 2, 3, or 4 positions on the aromatic muclei, and wherein $R_1$ and $R_2$ represent hydrogen; alkyl groups such as methyl, ethyl propyl, isopropyl, butyl, sec-butyl, tert-butyl, pentyl, isopentyl, hexyl, isohexyl, and the like; a cyclo (lower)-alkyl group, such as cyclohexyl or substituted cyclohexyl group, e.g., methyl-, ethyl, propyl-, butyl-, pentyl- and hexyl- substituted cyclohexyl, or an aromatic group such as phenyl, tolyl, xylyl, and the like. In addition, the phenolic rings may have other substituents besides the hydroxyl group, for example, lower alkyl groups containing from 1 to 4 carbon atoms, or halogen groups, particularly chlorine and bromine.

Illustrative of dihydric phenols falling within this general formula are 4,4'-dihydroxy diphenyl dimethyl methane (bisphenol A), 4,4' dihydroxy 3,3', 5,5', tetrabromo diphenyl dimethyl methane, 2,4'-dihydroxy diphenyl ethyl methane, 3,3'-dihydroxy diphenyl diethyl methane, 3,4'-dihydroxy diphenyl methyl propyl methane, 2,3'-dihydroxy diphenyl ethyl phenyl methane, 4,4'-dihydroxy diphenyl propyl phenyl methane, 4,4'-dihydroxy diphenyl butyl phenyl methane, 2,2'-dihydroxy diphenyl ditolyl methane, 4,4'-dihydroxy diphenyl tolyl methyl methane, 4,4'-dihydroxy diphenyl methane, and the like.

The most preferred non-fatty polyepoxide compounds envisioned for use in the present invention are the reaction products of bisphenol A and an epihalohydrin, i.e., the diglycidyl ethers of bisphenol A, preferably exhibiting an equivalent weight of from about 185 to 192.

Additionally, the reaction system must contain from about 25 to 75% by weight of total epoxy compounds, and preferably from about 25 to 50% by weight, of a mixture of at least two epoxidized fatty acid esters, and preferably triglycerides. These epoxidized fatty acid esters contain from 1 to 6 fatty chains, usually 1 or 3 fatty chains, of from about 10-24 carbon atoms each. The chains may be straight or branched, and may contain one or more unsaturated sites.

These epoxidized fatty acid esters may be prepared by epoxidizing (as by reacting with hydrogen peroxide), naturally occurring ethylenically unsaturated animal, marine and/or vegetable fats and oils. The most important source of such naturally occurring polyunsaturated triglycerides is vegetable oils. Thus, suitable epoxidized triglycerides can be prepared by epoxidizing linseed oil, soybean oil, perilla oil, oiticia oil, walnut oil, castor oil, sunflower oil, rapeseed oil, hempseed oil, cottonseed oil, and the like. Also, marine oil such as menhaden oil or sardine oil may be beneficially utilized to prepare the epoxidized triglycerides.

Usually, commercially available epoxidized fatty acid esters will be utilized. Examples of such commercially available epoxidized fatty acid esters are epoxidized soybean oil, epoxidized linseed oil, epoxidized menhaden oil, butyl epoxy linseedate (the epoxidized reaction product of butyl alcohol/linseed oil ester), and 2-ethyl hexyl epoxy tallate (the epoxidized reaction product of 2-ethyl hexanol/tall oil fatty acid ester). Although any weight percentage combination of the epoxidized fatty acid esters may be utilized, each epoxidized fatty acid ester is preferably present in an amount of at least 20 percent by weight, basis total epoxidized fatty acid esters.

Due to the presence of internal unsaturation in these fatty acid esters, epoxidation at the internal unsaturation sites results in epoxidized fatty acid esters having non-terminal 1:2 epoxy groups. On the other hand, most non-fatty polyepoxide compounds exhibit terminal 1:2 epoxy groups. We have determined that the incorporation of two or more epoxidized fatty acid esters in the oxirane reaction system results in a final resin product exhibiting increased thermal shock resistance.

The epoxy system containing at least one non-fatty polyepoxide compound, along with at least two epoxidized fatty acids esters, may be cured (hardened) by reaction with any anhydride derived from a polycarboxylic acid. As will be appreciated by those skilled in the art, the polycarboxylic acids used in the formation of the anhydrides may be saturated, unsaturated, aliphatic, cycloaliphatic, aromatic, or heterocyclic. As illustrative of the state of the art of anhydride curing agents for epoxy resin systems, the description of suitable anhydrides set forth in U.S. Pat. No. 3,977,996, Columns 10-11, is hereby incorporated by reference. Examples of preferred anhydride curing agents include phthalic anhydride, hexahydrophthalic anhydride, dodecylsuccinic anhydride, methyl endomethylene tetrahydrophthalic anhydride (commonly known as Nadic methyl anhydride), methyl tetrahydrophthalic anhydride, 3,3',4,4'-benzylphenone tetracarboxylic dianhydride and pyromellitic dianhydride.

The anhydride curing agent should be present in the reaction system at a level of from 0.4 to 1.2 chemical equivalents of anhydride per equivalent of oxirane; preferably, however, the anhydride will be present at levels of from about 0.4 to 0.9 equivalents, and most preferably at a level of 0.9 equivalents anhydride per equivalent of oxirane. By having an excess of epoxy reactants in the reaction system, the cured resin product will exhibit terminal epoxy groups rather than terminal acid groups.

The epoxy curing reaction is accelerated by the presence of a suitable catalyst (accelerator). Generally, it has been found that any compound capable of polarizing the polycarboxylic acid anhydride to yield a reactive carboxylic acid moiety can be utilized as the catalyst. The catalyst acts to open up the anhydride ring to form an acid moiety and the acid moiety then reacts with the epoxy compounds. As illustrative of the state of the art with respect to suitable epoxy/anhydride reaction catalysts, the description of suitable catalysts in U.S. Pat. No. 3,977,996, Columns 11-16, is hereby incorporated by reference.

It should be noted that among the suitable classes of catalysts are the quaternary ammonium hydroxides and halides, quaternary phosphonium halides, arsines, amine oxides, phosphines and phosphine oxides, phosphoramides, phosphine amines, and tertiary amines and tertiary aminophenols. Among the foregoing classes of suitable catalysts, the tertiary amines and tertiary aminophenols are particularly valuable in catalyzing the epoxy/anhydride reaction. Typical tertiary amines and tertiary aminophenols suitable for this purposes include benzyl dimethyl amine, dimethyl amino methyl phenol, triamylamine, 2,4,6-tri(dimethyl amino methyl) phenol, and N-amino ethyl piperazine. When a tertiary amine or tertiary aminophenol catalyst is utilized, it is normally incorporated in the reaction system at a level of from about 0.1 to 3.0 percent by weight of the total epoxy resin content, and usually at levels of from about 0.1 to 1.0 percent by weight.

Another class of suitable epoxy resin curing catalysts are the active chromium salts as described and claimed in U.S. Pat. Nos. 3,977,996 and 3,978,026, which descriptions are hereby incorporated by reference in order to illustrate the present state of the art. It is known that epoxy/anhydride curing reactions are accelarated by catalytically active chromium tricarboxylates. In particular, typical compounds in this class include dehydrated trivalent chromium salts containing from about 6-60 carbon atoms and selected from the group consisting of trivalent chromium hexanoate, trivalent chromium pentanoate, trivalent chromium butyrate, trivalent chromium 2-ethyl-hexanoate, trivalent chromium decanoate, trivalent chromium oleate, trivalent chromium stearate, trivalent chromium toluate, trivalent chromium cresylate, trivalent chromium benzoate, trivalent chromium alkyl benzoates, trivalent chromium alkoxy benzoates, trivalent chromium naphthanates, and trivalent chromium alkoxides.

We have confirmed that a particularly valuable catalyst system comprises a mixture of active trivalent chromium-2-ethyl-hexanoate, benzyl dimethylamine, phenol and a plasticizer. The plasticizer may be an alkyl phthalate such as dioctyl phthalate, di-isodecyl phthalate, or any other phthalate plasticizers typically used in the manufacture of plasticized polyvinylchloride formulations. The phthalate ester acts as a solvent for the catalyst salt. A typical catalyst system encompassing such a mixture contains about 25% by weight of trivalent chromium-2-ethyl-hexanoate, about 50% by weight of a phthalate ester, about 12.5% by weight benzyl dimethylamine, and about 12.5% by weight phenol. Such a catalyst system is commercially available under the trade name ATC-3 from Cordova Chemical Company, a division of Aerojet-General Corporation of El Monte, California. The catalyst system is employed at levels of from about 0.1 to 10% by weight of the total reaction system.

In carrying out the reaction, it is preferable to first disperse the catalyst in the anhydride curing agent, and thereafter add the epoxy compounds, usually at room temperature if all ingredients are liquid. The curing (hardening) reaction may be carried out in accordance with conventional prior art curing procedures. Thus, the curing may be carried out in either one or two curing steps. We have determined that a particularly desirable curing cycle for most epoxy resins of this invention comprises a first curing step at from about 75°-100° C. for from about 2-5 hours, followed by a second curing step at from about 120°-160° C. for from about 5-20 hours. As those skilled in the epoxy resin art will appreciate, a two step curing cycle is not required, and curing may be obtained by a one step curing process, for example, heating for from 2-5 hours at 180° C. or higher.

It should also be noted that, optionally, a polyol or mixture of polyols may be incorporated into the reaction system in order to provide improved tensile strength or increased flexibility. Any polyol may be incorporated, such as ethylene glycol or propylene glycol, but as those skilled in the art will appreciate, the use of trimethylolpropane as a chain extender in such systems is most desirable. Generally, the polyol reactant should be present in the reaction system at levels of from about 0.1 to 1.0 chemical equivalents of polyol per equivalent of epoxy.

In the following Examples, tensile strength determinations were carried out by following the procedure found in ASTM Procedure D-638, and Izod Impact Data were determined by following the procedure set forth in ASTM Procedure D-256. Thermal shock resistance data was obtained using the Union Carbide modification of the Olyphant Washer Test as described in "Insulation/Circuits," May, 1973, pages 33-38. In this test, a steel washer is supported on a cellulose base and the epoxy resin is cast around it. After the epoxy resin is cured, it is then cycled through repetitive heat and cold atmospheres, changing the temperatures at each cycle according to the following program:

| Cycle No. | 30 Minutes at High Temperature ° C. | 10 Minutes at Low Temperature ° C. | Temperature Differential ° C. |
|---|---|---|---|
| 1 | 60 | 20 | 40 |
| 2 | 80 | 10 | 70 |
| 3 | 100 | 0 | 100 |
| 4 | 120 | −10 | 130 |
| 5 | 140 | −20 | 160 |
| 6 | 160 | −30 | 190 |
| 7 | 180 | −40 | 220 |
| 8 | 200 | −50 | 250 |
| 9 | 220 | −60 | 280 |
| 10 | 240 | −70 | 310 |

The sample is examined after each cold condition, and at first sign of a crack, the sample is considered a failure. The number that fail in a particular cycle, as well as the cycle number, are noted and multiplied together. The sum of the products of cycle number times number of failures is then divided by the total number of samples in the test to give an average value. This is the average cycle to failure value.

EXAMPLES 1-24

A large number of epoxy resin systems were prepared by reacting 0.9 equivalents methyl tetrahydrophthalic anhydride per 1.0 equivalent epoxy with one or more of the following epoxy compounds: diglycidyl ether of bis-phenol A (equivalent weight of 185-192), epoxidized linseed oil, epoxidized soybean oil and butyl epoxy linseedate. An amount equivalent to 3.0% by weight of the total reaction system of the chromium 2-ethyl hexanoate catalyst ATC-3 (Cordova Chemical Company, a division of Aerojet-General Corp.) was added as an accelerator. The resin systems were cast and cured around steel washers (using 2-inch disposable aluminum dishes as molds) at 75° C. for 5 hours followed by 150° C. for 15 hours. Various tests were then conducted on the cured epoxy resin systems to determine the average cycle to failure values, notched and unnotched inpact strength, and tensile strength. The results are tabulated in Table I.

TABLE I

| Example No. | Weight % Diglycidyl Ether of Bis-phenol A | Weight % Epoxidized Linseed Oil | Weight % Epoxidized Soybean Oil | Weight % Butyl Epoxy Linseedate | Average Cycle To Failure Value | Unnotched Impact Strength (Foot-pounds/ Sq. In.) | Notched Impact Strength (Foot-pounds/ Sq. In.) | Tensile Strength (PSI×10³) |
|---|---|---|---|---|---|---|---|---|
| 1 | 100 | — | — | — | 3.8 | 2.87 | 0.65 | 6.7 |
| 2 | — | 100 | — | — | 0.0 | 1.22 | 0.7 | 3.8 |
| 3 | 50 | 50 | — | — | 3.9 | 3.19 | 0.16 | 4.5 |
| 4 | 75 | 25 | — | — | 2.8 | 3.34 | 0.26 | 5.8 |
| 5 | — | — | 100 | — | 0.0 | 0.49 | 0.48 | 2.0 |
| 6 | 50 | — | 50 | — | 6.6 | 3.40 | 0.53 | 6.5 |
| 7 | 75 | — | 25 | — | 4.3 | 4.32 | 0.72 | 7.4 |
| 8 | — | 50 | 50 | — | 0.0 | 1.15 | 0.05 | 2.3 |
| 9 | — | 56.25 | 18.75 | 25 | 0.0 | 0.94 | 0.02 | 2.3 |
| 10 | — | 18.75 | 56.25 | 25 | 0.0 | 1.81 | 0.03 | 1.9 |
| 11 | 50 | 12.5 | 12.5 | 25 | 7.7 | 1.68 | 0.29 | 4.6 |
| 12 | 25 | 48.75 | 16.25 | 10 | 7.2 | 1.43 | 0.32 | 4.1 |
| 13 | 50 | 10 | 30 | 10 | 7.8 | 3.03 | 0.27 | 5.8 |
| 14 | 25 | 18.75 | 6.25 | 50 | 6.6 | 1.07 | 0.04 | 3.0 |
| 15 | 40 | 5 | 15 | 40 | 7.5 | 1.65 | 0.05 | 4.0 |
| 16 | 25 | 56.25 | 18.75 | — | 7.1 | 1.50 | 0.14 | 3.2 |
| 17 | 50 | 12.5 | 37.5 | — | 8.1 | 2.56 | 0.24 | 5.6 |
| 18 | 75 | 12.5 | 12.5 | — | 7.7 | 2.63 | 0.29 | 7.0 |
| 19 | 25 | 65 | — | 10 | 5.3 | 1.57 | 0.21 | 3.6 |
| 20 | 25 | 35 | — | 40 | 6.9 | 1.45 | 0.04 | 3.1 |
| 21 | 75 | 15 | — | 10 | 7.4 | 2.96 | 0.35 | 4.5 |
| 22 | 25 | — | 65 | 10 | 7.7 | 1.90 | 0.38 | 2.3 |
| 23 | 25 | — | 35 | 40 | 6.2 | 1.09 | 0.04 | 2.5 |
| 24 | 75 | — | 15 | 10 | 7.2 | 1.76 | 0.16 | 5.0 |

Examples 1-10 tabulate physical property data of cured resin systems comprising cured diglycidyl ether of bis-phenol A, or cured epoxidized fatty acid esters, or a cured resin system containing both diglycidyl ether of bis-phenol A and a signle epoxidized fatty acid ester. Examples 11-24 tabulate physical property data of the 0.9 chemical equivalents level per equivalent of epoxy in some of the systems. Cycle to failure values, and tensile strength were measured and tabulated in Table III.

TABLE III

| Ex. No. | Weight % Diglycidyl Ether of Bis-phenol A | Weight % Epoxidized Linseed Oil | Weight % Epoxidized Soybean Oil | Trimethylol-Propane | Average Cycle to Failure Value | Tensile Strength (PSI $\times 10^3$) |
|---|---|---|---|---|---|---|
| 31 | 100 | — | — | — | 3.5 | 4.5 |
| 32 | — | 100.0 | — | — | 0.0 | 0.0 |
| 33 | — | — | 100.0 | — | 0.0 | 0.0 |
| 34 | 75 | 12.5 | 12.5 | — | 6.7 | 4.3 |
| 35 | 50 | 25.0 | 25.0 | — | 7.0 | 3.3 |
| 36 | 100 | — | — | Yes | 8.3 | 8.3 |
| 37 | — | 100.0 | — | Yes | 7.8 | 6.8 |
| 38 | — | — | 100.0 | Yes | 6.8 | 3.7 |
| 39 | 75 | 12.5 | 12.5 | Yes | 7.7 | 7.6 |
| 40 | 50 | 50.0 | — | Yes | 7.6 | 7.3 |
| 41 | 50 | — | 50.0 | Yes | 7.4 | 7.4 |
| 42 | 50 | 25.0 | 25.0 | Yes | 7.4 | 7.3 | cured resin systems containing from 25-75% diglycidyl ether of bis-phenol A and from 25-75% of at least two different epoxidized fatty acid esters. It should be noted that the resin systems prepared in accordance with the present invention (Examples 11-24) tend to exhibit remarkably superior average cycle to failure values, as well as excellent tensile strengths. Moreover, it will be noted that the resin systems of Examples 11-24 appear to exhibit synergistic properties with respect to average cycle to failure values.

EXAMPLES 25-30

Additional resin systems were prepared by reacting 0.9 equivalents methyl tetrahydrophthalic anhydride per 1.0 equivalent epoxy with diglycidyl ether of bis-phenol-A (equivalent weight of 185-192), epoxidized linseed oil and epoxidized soybean oil as set forth in Table II. The epoxy/anhydride reaction was catalyzed with 1.0% by weight (basis total epoxy reactant) of benzyl dimethylamine. The resin system was cured at 100° C. for 5 hours followed by 15 hours at 150° C. Average cycle to failure values were determined and tabulated in Table II.

TABLE II

| Ex. No. | Wt. % of Diglycidyl Ether of Bisphenol A | Wt. % of Epoxodized Soybean Oil | Wt. % of Epoxidized Linseed Oil | Average Cycle to Failure Value |
|---|---|---|---|---|
| 25 | 75 | 12.5 | 12.5 | 3.4 |
| 26 | 75 | — | 25.0 | 2.5 |
| 27 | 75 | 25.0 | — | 2,7 |
| 28 | 50 | 25.0 | 25.0 | 6.7 |
| 29 | 50 | — | 50.0 | 2.6 |
| 30 | 50 | 50.0 | — | * |

* Denotes incompatibility of reactants

Examples 25 and 28 illustrate the superior average cycle to failure values obtained by practicing the present invention.

EXAMPLES 31-42

Additional resin systems were prepared utilizing one or more of the following epoxy components: diglycidyl ether of bis-phenol A, epoxidized linseed oil and epoxidized soybean oil. A catalyst system comprising ATC-3 from Cordove Chemical Company was utilized at a level of 3.0% by weight basis the total reaction system. The epoxy systems were cured by heating at 100° C. for 5 hours followed by 15 hours at 150° C. in the presence of 0.9 equivalents of Nadic methyl anhydride per equivalent of epoxy. Also, trimethylolpropane was added at Obviously many modifications and variations of the invention as hereinbefore set forth may be made without departing from the spirit and scope thereof, and, therefore, only such limitations should be imposed as are indicated in the appended claims.

We claim:

1. A thermosetting epoxy resin comprising the reaction product of (a) from about 25 to 75% by weight (basis total epoxy content) of a non-fatty polyepoxide compound, having reactive 1,2-epoxy groups (b) from about 25 to 75% by weight (basis total epoxy content) of at least two epoxidized fatty acid esters, and (c) from about 0.4 to 1.2 chemical equivalents (basis total epoxy content) of a polycarboxylic acid anhydride curing agent.

2. The thermosetting resin of claim 1 wherein the non-fatty polyepoxide is the reaction product of an epihalohydrin and a dihydric phenol.

3. The thermosetting resin of claim 2 wherein the epoxidized fatty acid esters are selected from the group consisting of epoxidized linseed oil, epoxidized soybean oil, epoxidized menhaden oil, butyl epoxy linseedate, and 2-ethyl hexyl epoxy tallate, and wherein the polyepoxide is a diglycidyl ether of bisphenol.

4. The thermosetting resin of claim 3 wherein the anhydride is selected from the group consisting of dodecylsuccinic anhydride, methyl endomethylene tetrahydrophthalic anhydride and methyl tetrahydrophthalic anhydride.

5. A process for preparing a thermosetting epoxy resin comprising heating in the presence of a catalytic amount of an epoxy/anhydride reaction accelerator a mixture containing (a) from about 25 to 75% by weight (basis total epoxy content) of a non-fatty polyepoxide compound, having reactive 1,2-epoxy groups (b) from about 25-75% by weight (basis total epoxy content) of at least two epoxidized fatty acid esters, and (c) from about 0.4 to 1.2 chemical equivalents basis total epoxy content of a polycarboxylic acid anhydride curing agent.

6. The process of claim 5 wherein the non-fatty polyepoxide is present in the amount of from about 50 to 75% by weight, wherein the epoxidized fatty esters are present in the amount of from about 25 to 50% by weight, and wherein the anhydride curing agent is present in the amount of from about 0.4 to 0.9 equivalents basis total epoxy.

7. The process of claim 6 wherein the non-fatty polyepoxide is a diglycidyl ether of bis-phenol, and wherein the anhydride curing agent is selected from the group consisting of dodecylsuccinic andydride, methyl tetrahydrophthalic anhydride, and methyl endomethylene tetrahydrophthalic anhydride.

8. The process of claim 7 wherein the epoxidized fatty esters are selected from the group consisting of epoxidized linseed oil, epoxidized soybean oil, epoxidized menhaden oil, butyl epoxy linseedate and 2-ethyl hexyl epoxy tallate.

9. The process of claim 8 wherein the catalyst comprises benzyl dimethyl amine.

10. The process of claim 8 wherein the catalyst comprises active chromium-2-ethyl hexanoate.